US012453355B2

(12) United States Patent
Williams et al.

(10) Patent No.: US 12,453,355 B2
(45) Date of Patent: Oct. 28, 2025

(54) EMULSIFIER COMPOSITIONS, AND METHODS OF PRODUCTION AND USE

(71) Applicant: Vantage Specialty Chemicals, Inc., Gurnee, IL (US)

(72) Inventors: Laura Anne Williams, Oak Creek, WI (US); Michael Snarski, Kulpmont, PA (US); Jianhua Wang, Naperville, IL (US); Michael Savidakis, Lindenhurst, IL (US)

(73) Assignee: Vantage Specialty Chemicals, Inc., Gurnee, IL (US)

( * ) Notice: Subject to any disclaimer, the term of this patent is extended or adjusted under 35 U.S.C. 154(b) by 0 days.

(21) Appl. No.: 18/673,911

(22) Filed: May 24, 2024

(65) Prior Publication Data
US 2024/0397958 A1 Dec. 5, 2024

Related U.S. Application Data

(60) Provisional application No. 63/505,656, filed on Jun. 1, 2023.

(51) Int. Cl.
A23D 9/02 (2006.01)
A21D 2/14 (2006.01)
A21D 2/16 (2006.01)
A21D 13/80 (2017.01)

(52) U.S. Cl.
CPC ............... *A21D 2/16* (2013.01); *A21D 2/145* (2013.01); *A21D 13/80* (2017.01)

(58) Field of Classification Search
None
See application file for complete search history.

(56) References Cited

U.S. PATENT DOCUMENTS

| 4,339,465 | A | 7/1982 | Strouss |
| 4,547,388 | A | 10/1985 | Strouss |
| 5,503,866 | A | 4/1996 | Wilhelm |
| 5,662,956 | A | 9/1997 | Knightly |
| 6,306,447 | B1 | 10/2001 | Jensen |
| 6,613,376 | B2 | 9/2003 | Smith et al. |
| 6,852,349 | B2 | 2/2005 | Smith et al. |
| 8,192,769 | B2 | 6/2012 | Wester et al. |
| 8,287,930 | B2 | 10/2012 | Elmusa et al. |
| 8,795,757 | B2 | 8/2014 | Schrader et al. |
| 9,861,611 | B2 | 1/2018 | Bromley |

| 2003/0203070 | A1 | 10/2003 | Lin et al. |
| 2004/0115332 | A1 | 6/2004 | Teran et al. |
| 2007/0009643 | A1* | 1/2007 | Baseeth ................ A23P 30/40 426/601 |
| 2007/0292563 | A1 | 12/2007 | Kappelman et al. |
| 2008/0233240 | A1 | 9/2008 | Wegman et al. |
| 2009/0214741 | A1 | 8/2009 | Atapattu et al. |
| 2011/0274799 | A1 | 11/2011 | Wilhelm et al. |
| 2013/0004621 | A1 | 1/2013 | Schrader et al. |
| 2013/0101703 | A9 | 4/2013 | Colavito |
| 2015/0056360 | A1 | 2/2015 | Beeson et al. |
| 2016/0029654 | A1 | 2/2016 | Baier et al. |
| 2016/0183557 | A1 | 6/2016 | Aronen et al. |
| 2016/0183558 | A1 | 6/2016 | Nocek et al. |
| 2018/0325970 | A1 | 11/2018 | Schlotterbeck Suárez et al. |
| 2019/0254304 | A1 | 8/2019 | Baier et al. |
| 2020/0367513 | A1 | 11/2020 | Boutte et al. |
| 2021/0037866 | A1 | 2/2021 | Zhang |
| 2022/0167642 | A1 | 6/2022 | Erni et al. |
| 2024/0298661 | A1 | 9/2024 | Ergun et al. |

FOREIGN PATENT DOCUMENTS

| BR | 112020010385 B1 | 8/2022 |
| CA | 2749638 A1 | 2/2013 |
| CA | 2875321 A1 | 12/2013 |
| CA | 2660863 C | 11/2015 |
| CA | 3097700 A1 | 10/2019 |
| EP | 2229817 B1 | 1/2012 |
| EP | 2096928 B1 | 5/2015 |
| EP | 3781318 A1 | 2/2021 |
| GB | 2441294 B | 5/2011 |
| JP | 5779289 B1 | 7/2015 |
| JP | 2019047782 A | 3/2019 |
| MX | 2014011192 A | 11/2014 |

(Continued)

OTHER PUBLICATIONS

International Search Report and Written Opinion issued in International Applicaiton No. PCT/US2021/034222, issued on Sep. 9, 2021, 15 pages.

(Continued)

Primary Examiner — Lien T Tran
(74) Attorney, Agent, or Firm — Dorsey & Whitney LLP

(57) ABSTRACT

An emulsifier blend includes an edible acid from about 0.05 to about 0.5 wt %, a polyglycerol ester from about 10 to about 20 wt %, sorbitan monostearate from about 10 to about 20 wt %, propylene glycol from about 1.0 to about 5.0 wt % of the emulsifier blend, and water that accounts for a majority of the emulsifier blend. Optional components include distilled monoglycerides up to about 20 wt %, monoglycerides and diglycerides up to about 20 wt %, and glycerin, lecithin, or vegetable oil, each accounting for up to about 6 wt % of the emulsifier blend. The aforementioned emulsifier components may exclude the allergenic sources of: milk, eggs, fish, crustacean shellfish, peanuts, wheat, soybeans, and sesame; and may exclude GMOs.

6 Claims, 10 Drawing Sheets

(56) References Cited

FOREIGN PATENT DOCUMENTS

| WO | 9422313 | A1 | 10/1994 |
|----|---------|----|---------|
| WO | 9920111 | A1 | 4/1999 |
| WO | 03083023 | A2 | 10/2003 |
| WO | 2024249304 | | 12/2024 |

OTHER PUBLICATIONS

Yang, et al., "Chapter Two—Chemical Synthesis of Saponins", Advances in Carbohydrate Chemistry and Biochemistry, vol. 79, pp. 63-150, 2021, ISSN 0065-2318, ISBN 9780128246269, Elsevier B.V. Only Abstract Provided.

International Search Report and Written Opinion issued in International Application No. PCT/US2024/031004, mailed on Feb. 3, 2025, 14 pages.

Zielinski, "Synthesis and Composition of Food-Grade Emulsifiers", Chapter Two, Food Emulsifiers and Their Applications, pp. 11-38, 1997, Springer, Boston, MA.

* cited by examiner

| Cake Formula | A | | B | | C | | D | | E | | F | |
|---|---|---|---|---|---|---|---|---|---|---|---|---|
| | g | % | g | % | g | % | g | % | g | % | g | % |
| Flour | 102.56 | 0.226122 | 102.56 | 0.226122 | 102.56 | 0.226122 | 102.56 | 0.239654 | 102.56 | 0.226122 | 102.56 | 0.231184 |
| Sugar | 158.76 | 0.350031 | 158.76 | 0.350031 | 158.76 | 0.350031 | 158.76 | 0.370978 | 158.76 | 0.350031 | 158.76 | 0.357866 |
| Baking Powder | 3.16 | 0.006967 | 3.16 | 0.006967 | 3.16 | 0.006967 | 3.16 | 0.007384 | 3.16 | 0.006967 | 3.16 | 0.007123 |
| Salt | 3.16 | 0.006967 | 3.16 | 0.006967 | 3.16 | 0.006967 | 3.16 | 0.007384 | 3.16 | 0.006967 | 3.16 | 0.007123 |
| NFDM | 10.52 | 0.023194 | 10.52 | 0.023194 | 10.52 | 0.023194 | 10.52 | 0.024582 | 10.52 | 0.023194 | 10.52 | 0.023713 |
| Clean Emulsifer | 3.49 | 0.007695 | 6.98 | 0.015389 | 6.98 | 0.015389 | 6.98 | 0.01631 | 10.47 | 0.023084 | 10.47 | 0.023601 |
| Shortening (FG344) | 14.06 | 0.030999 | 10.57 | 0.023305 | 10.57 | 0.023305 | 10.57 | 0.024699 | 7.08 | 0.01561 | | 0.023826 |
| Eggs | 63.23 | 0.139408 | 63.23 | 0.139408 | 63.23 | 0.139408 | 63.23 | 0.147751 | 63.23 | 0.139408 | 63.23 | 0.142529 |
| Water 1 | 56.2 | 0.123909 | 56.2 | 0.123909 | 56.2 | 0.123909 | 56.2 | 0.131324 | 56.2 | 0.123909 | 56.2 | 0.126682 |
| Water 2 | 38.42 | 0.084708 | 38.42 | 0.084708 | 38.42 | 0.084708 | 12.81 | 0.029933 | 38.42 | 0.084708 | 25 | 0.056353 |
| Total | 453.56 | 1 | 453.56 | 1 | 453.56 | 1 | 427.95 | 1 | 453.56 | 1 | 443.63 | 1 |

FIG. 1A

 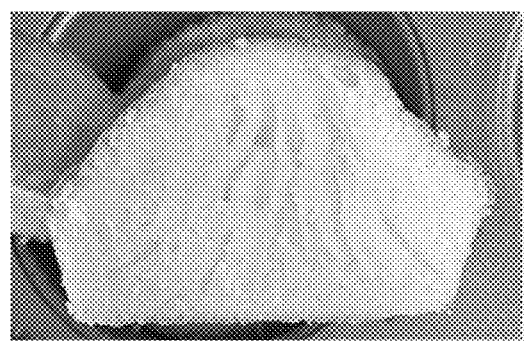
Fig. 1B                    Fig. 1C

Table 10

| Raw No. | Description/Notebook Number | SK-Hi Water % | SK-Hi Water 800 g Batch | SK-Low Water % | SK-Low Water 800 g Batch | SK-Mid Water % | SK-Mid Water 800 g Batch | SK-Hi Water No DM % | SK-Hi Water No DM 800 g Batch | SK-Low Water No DM % | SK-Low Water No DM 800 g Batch | SK-Mid Water No DM % | SK-Mid Water No DM 800 g Batch |
|---|---|---|---|---|---|---|---|---|---|---|---|---|---|
| R WATER | Water | 58.34% | 466.72 | 43.34% | 346.72 | 50.84% | 406.72 | 58.34% | 466.72 | 43.34% | 346.72 | 50.84% | 406.72 |
| R CITR | Citric Acid | 0.22% | 1.76 | 0.30% | 2.40 | 0.26% | 2.08 | 0.22% | 1.76 | 0.30% | 2.40 | 0.26% | 2.08 |
| R 3185 | Polyaldo-10-1-O | 11.34% | 90.72 | 15.42% | 123.36 | 13.38% | 107.04 | 11.34% | 90.72 | 15.42% | 123.36 | 13.38% | 107.04 |
| R 3059 | Distilled Monoglycerides | 6.06% | 48.48 | 8.24% | 65.92 | 7.15% | 57.20 | 0.00% | 0.00 | 0.00% | 0.00 | 0.00% | 0.00 |
| R 3184 | GMS | 6.06% | 48.48 | 8.24% | 65.92 | 7.15% | 57.20 | 12.12% | 96.96 | 16.48% | 131.84 | 14.30% | 114.40 |
| R 3009 | SMS KP | 14.03% | 112.24 | 19.08% | 152.64 | 16.56% | 132.48 | 14.03% | 112.24 | 19.08% | 152.64 | 16.56% | 132.48 |
| R PROP | Propylene Glycol | 2.95% | 23.60 | 4.01% | 32.08 | 3.48% | 27.84 | 2.95% | 23.60 | 4.01% | 32.08 | 3.48% | 27.84 |
| R CNUN | Canola Lecithin | 1.00% | 8.00 | 1.36% | 10.88 | 1.18% | 9.44 | 1.00% | 8.00 | 1.36% | 10.88 | 1.18% | 9.44 |
| Total | | 100.00% | 800.00 | 99.99% | 799.92 | 100.00% | 800.00 | 100.00% | 800.00 | 99.99% | 799.92 | 100.00% | 800.00 |

Fig. 3A

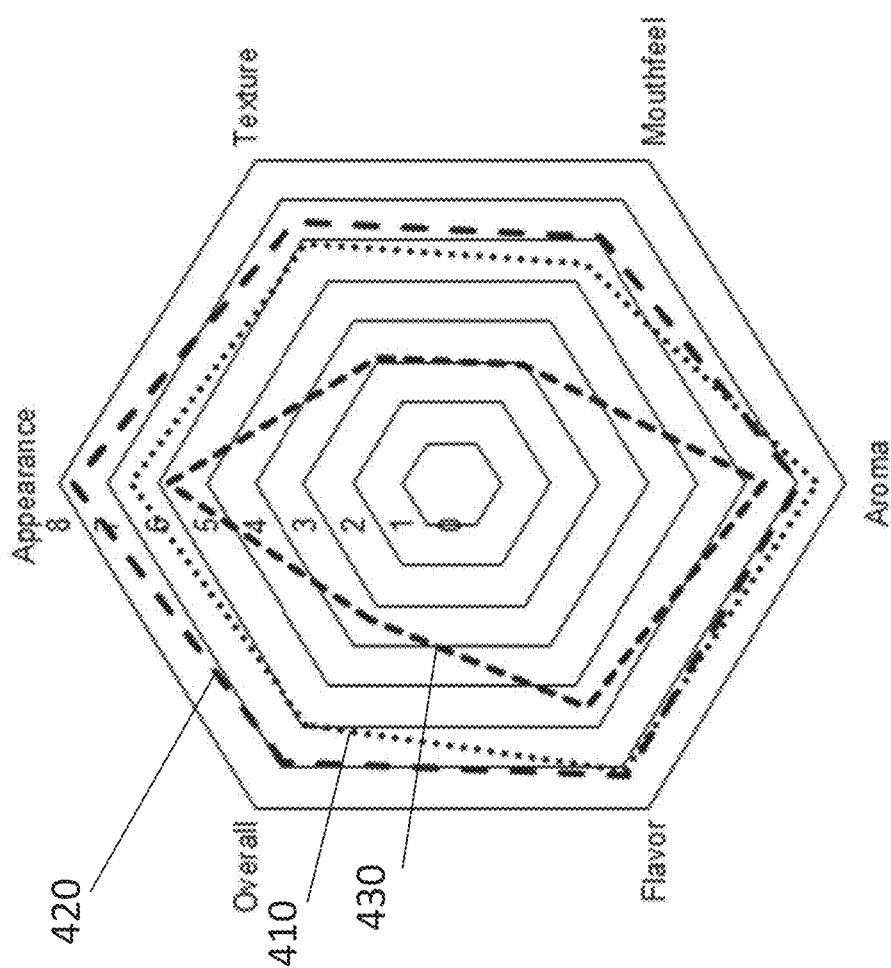

EMULSIFIER COMPOSITIONS, AND METHODS OF PRODUCTION AND USE

CROSS REFERENCE TO RELATED APPLICATIONS

This application claims priority to U.S. Provisional Patent Application No. 63/505,656, filed on Jun. 1, 2023, entitled "EMULSIFIER COMPOSITIONS, AND METHODS OF PRODUCTION AND USE", which is incorporated by reference herein, in the entirety and for all purposed.

TECHNICAL FIELD

Provided are emulsifier products free of allergenic components and GMOs for use in comestible products.

BACKGROUND

Emulsifiers and emulsifier blends are used in a wide range of baked goods including bagels, biscuits, breads, buns, cakes, cookies, pastries, pizza, and tortillas. Emulsifiers and emulsifier blends play important roles in baked goods including extending shelf-life by preventing staling, providing uniform crumb and cell structure, maintaining taste and texture, facilitate the incorporation of air and water, shortening mixing times, reducing fat content, traps gases in leavened doughs, improving volume, and appearance enhancement, to name a few.

"Clean Label" trends continue to be a focus in the baking industry but this term lacks a standard definition. In addition, consumers have not clearly defined what is considered to be acceptable or "clean" ingredients. Some focus on the exclusion of ingredients that are made from genetically modified (GMO) feed stocks. Others focus on excluding anything that sounds like a chemical, is made by an industrial chemical process, or an ingredient that one does not find in a home pantry.

SUMMARY

Implementations provide clean emulsifier blends that are effective in functioning as an emulsifier without the concerns of allergenic components from prior approaches.

According to implementations, an emulsifier blend for comestibles may include an edible acid from about 0.05 to about 0.5 wt % of the emulsifier blend; a polyglycerol ester from about 10 to about 20 wt % of the emulsifier blend; sorbitan monostearate from about 10 to about 20 wt % of the emulsifier blend; propylene glycol from about 1.0 to about 5.0 wt % of the emulsifier blend; and water, where the water may account for a majority of the emulsifier blend.

In implementations and alternatives, the water may account for at least about 50 wt % of the emulsifier blend. In addition or alternatively, the emulsifier blend may include distilled monoglycerides from about 5 to about 20 wt % of the emulsifier blend, and/or monoglycerides and diglycerides from about 5 to about 20 wt % of the emulsifier blend. In addition or alternatively, the emulsifier blend may include one or more of glycerin, a lecithin, or a vegetable oil, from about 0.1 to about 6 wt % of the emulsifier blend. In some cases, each of the glycerin, lecithin, and vegetable oil may be present at about 0.1 to about 6.0 wt % of the emulsifier blend.

According to other implementations, an emulsifier blend for comestibles may consist essentially of an edible acid from about 0.05 to about 0.5 wt % of the emulsifier blend; a polyglycerol ester from about 10 to about 20 wt % of the emulsifier blend; sorbitan monostearate from about 10 to about 20 wt % of the emulsifier blend; propylene glycol from about 1.0 to about 5.0 wt % of the emulsifier blend; optionally distilled monoglycerides up to about 20 wt % of the emulsifier blend; optionally monoglycerides and diglycerides up to about 20 wt % of the emulsifier blend; optionally one or more of glycerin, a lecithin, or a vegetable oil, each accounting for up to about 6 wt % of the emulsifier blend; and water forming a balance of the emulsifier blend, wherein the water accounts for a majority of the emulsifier blend.

In implementations and alternatives, the water accounts for at least about 50 wt % of the emulsifier blend. In addition or alternatively, the distilled monoglycerides are present at about 5 wt % to about 15 wt % of the emulsifier blend, and/or the monoglycerides and diglycerides are present at about 5 wt % to about 15 wt % of the emulsifier blend, and/or the glycerin is present at about 0.1 to about 5 wt % of the emulsifier blend. In some cases, each of the glycerin, lecithin, and vegetable oil may be present at about 0.1 to about 6.0 wt % of the emulsifier blend.

According to further implementations, a method of producing an emulsifier blend for comestibles may include admixing water with citric acid, propylene glycol, lecithin, and polyglycerol ester to form an admixture while mixing at a first mixing rate during heating to elevated temperatures of at least about 150° F., wherein a vortex is formed in the admixture at the first mixing rate; maintaining the vortex in the admixture while adding mono and diglycerides and heating to the elevated temperatures; maintaining the vortex in the admixture while adding sorbitan monostearate and heating to the elevated temperatures, where an emulsifier blend at the elevated temperatures is formed. Then gradually decreasing a temperature of the emulsifier blend while subjecting the emulsifier blend to a second mixing rate higher than the first mixing rate to maintain the vortex. The emulsifier blend may contain at least 40 wt % water, and wherein water accounts for more of the emulsifier blend than any other component of the emulsifier blend.

In implementations and alternatives, the method may further involve subjecting the emulsifier blend to a third mixing rate higher than the second mixing rate during the step of gradually decreasing the temperature. In some cases, the elevated temperatures is about 170° F. In implementations and alternatives, the method may further involve maintaining the emulsifier blend at the elevated temperatures prior to gradually decreasing the temperature of the emulsifier blend, and/or upon the emulsifier blend reaching a temperature of about 130° F., ceasing mixing, and packaging the emulsifier blend, and/or maintaining the vortex in the admixture while adding distilled monoglycerides and heating to the elevated temperatures.

BRIEF DESCRIPTION OF THE DRAWINGS

FIG. 1A is Table 2 listing cake formulas containing clean emulsifiers of the present disclosure.

FIGS. 1B-1I are photographs of cakes produced using the cake formulas containing the clean emulsifiers of the present disclosure.

FIG. 3A is Table 10 listing compositions of the clean emulsifiers of the present disclosure containing a high, low, and medium amount of water, with and without distilled monoglycerides.

FIG. 4 illustrates a sensory evaluation chart for cupcakes incorporating the clean emulsifier of the present disclosure.

DETAILED DESCRIPTION

Figure 1D:

The disclosed clean emulsifier blends may function as an emulsifier without the concerns of allergenic components from prior approaches, by excluding from the blends, GMOs (genetically modified organisms) and the nine major food allergens (milk, eggs, fish, crustacean shellfish, peanuts, wheat, soybeans, and sesame) as described by the US Food & Drug Administration, and for instance, may as well exceed the ingredient requirements set forth by major specialty grocers. Using this approach, the challenges of working with enzymes, which can be very delicate where processing and shelf life are concerned, have been removed.

The clean emulsifier blends of the present disclosure may be useful in a variety of comestibles such as cake, pastry and cookie products, but may also be used in other baked good categories including bagels, biscuits, breads, buns, cakes, cookies, pastries, pizza, and tortillas.

The clean emulsifier blends may be water-based, with water being the primary component of the emulsifier. The clean emulsifier blends may include an aqueous or water phase, and an oil phase. In addition to water, the clean emulsifier blends may additionally contain components including but not limited to: edible acids, polyglycerol esters, distilled monoglycerides, monoglycerides and diglycerides, sorbitan monostearate, propylene glycol, glycerin, lecithin, vegetable oil, as well as other components disclosed herein. According to implementations of the present disclosure, the sources of the aforementioned emulsifier components may exclude allergens including the allergenic sources of: milk, eggs, fish, crustacean shellfish, peanuts, wheat, soybeans, and sesame; and may exclude GMOs, e.g., may be GMO-free.

Water in the emulsifier may account for about 40 to about 70 wt %, about 45 to about 70 wt %, about 50 to about 70 wt %, about 55 to about 70 wt %, about 60 to about 70 wt %, about 65 to about 70 wt %, about 45 to about 50 wt %, about 40 to about 50 wt %, about 45 to about 55 wt %, about 40 to about 55 wt %, about 40 to about 60 wt %, about 40 to about 65 wt %, about 50 to about 75 wt %, about 50 to about 65 wt %, about 50 to about 60 wt %, about 50 to about 55 wt %, or any of the aforementioned range combinations, of the emulsifier. Water may account for more of the clean emulsifier blends than any other component.

Edible acids in the emulsifier may include but are not limited to: citric acid, malic acid, lactic acid, folic acid, acetic acid, phosphoric acid, and combinations thereof.

The one or more edible acid in the emulsifier may account for about 0.05 to about 0.50 wt %, about 0.15 to about 0.40 wt %, about 0.05 to about 0.30 wt %, about 0.05 to about 0.25 wt %, about 0.1 to about 0.40 wt %, or about 0.20 to about 0.50 wt %, or any of the aforementioned range combinations, of the emulsifier, or about 0.01, 0.02, 0.03, 0.04, 0.05, 0.06, 0.07, 0.08, 0.09, 0.10, 0.15, 0.2, 0.25, 0.30, 0.35, 0.40, 0.45, 0.50, 0.55, 0.60, 0.7, 0.8, 0.9, or 1.0 wt %, or any range of any of the aforementioned numbers, of the emulsifier.

Polyglycerol ester in the emulsifier may include but are not limited to: polyglycerol esters of fatty acids; polyglycerol condensed ricinoleic acid ester; polyglycerol condensed ricinoleic acid ester; polyglycerol esters of monoglycerides and/or diglycerides such as hexaglyceryl distearate, other amphiphilic polyglycerol esters, and combinations thereof.

The one or more polyglycerol ester in the emulsifier may account for about 5 to about 25 wt %, about 10 to about 20 wt %, about 5 to about 15 wt %, about 10 to about 18%, about 11 to about 20 wt %, about 10 to about 15 wt %, about 11 to about 15 wt %, about 15 to about 20 wt %, any of the aforementioned range combinations, or about 5, 6, 7, 8, 9, 10, 11, 12, 13, 14, 15, 16, 17, 18, 19, 20, 21, 22, 23, 24 or 25 wt %, or any range of any of the aforementioned numbers, of the emulsifier. The polyglycerol ester in the emulsifier may also serve as a stabilizing emulsifying agent, as an acid, a dispersant, and/or lubricant. The polyglycerol ester may be plant-derived, may be non-GMO, and may have a HLB of about 10-15, such as about 10, 11, 12, 13, 14 or 15, +/−0.3.

Distilled monoglycerides may optionally be included in the emulsifier, and when present, may include but are not limited to: distilled monoglyceride from a plant-based oil or fat, distilled lactylated or acetylated monglycerides, or other distilled monoglyceride isolated from diglycerides.

The distilled monoglycerides in the emulsifier may account for about 0 to about 20 wt %, about 1 to about 20 wt %, about 5 to about 15 wt %, about 5 to about 18 wt %, about 7 to about 18 wt %, about 1 to about 7 wt %, about 1 to about 10 wt %, about 1 to about 15 wt %, about 5 to about 10%, about 10 to about 15 wt %, about 10 to about 20 wt %, or any of the aforementioned range combinations, or about 1, 2, 3, 4, 5, 6, 7, 8, 9, 10, 11, 12, 13, 14, 15, 16, 17, 18, 19, 20 wt % or any range of any of the aforementioned numbers, of the emulsifier. The distilled monoglycerides may serve to stabilize emulsions and to thicken or foam oils.

Monoglycerides and diglycerides may optionally be included in the emulsifier, and when present, include but are not limited to: monoglycerides and diglycerides, unsaturated monoglycerides and diglycerides, saturated monoglycerides and diglycerides, stearin and palmitin monoglycerides and diglycerides, polyglycerol ester of monoglycerides and diglycerides such as hexaglyceryl distearate, and combinations.

The monoglycerides and diglycerides in the emulsifier may be derived from glycerol reacted with fatty acids derived from plants or animals, or from the breakdown of fats and oils derived from plants or animals. Natural sources of monoglycerides and diglycerides may include plant oils, including but not limited to: grapeseed, canola, olive, avocado, sunflower, cottonseed, coconut, and palm oil; plant pulp such as grape pulp or tomato pulp; as well as some animal fats, e.g., beef tallow.

The monoglycerides and diglycerides in the emulsifier may account for about 0 to about 20 wt %, about 1 to about 20 wt %, about 5 to about 15 wt %, about 5 to about 18 wt %, about 7 to about 18 wt %, about 1 to about 7 wt %, about 1 to about 10 wt %, about 1 to about 15 wt %, about 5 to about 10%, about 10 to about 15 wt %, about 10 to about 20 wt %, or any of the aforementioned range combinations, or about 1, 2, 3, 4, 5, 6, 7, 8, 9, 10, 11, 12, 13, 14, 15, 16, 17, 18, 19, 20 wt % or any range of any of the aforementioned numbers, of the emulsifier. The monoglycerides and diglycerides in the emulsifier may serve as a stabilizer; to prevent or reduce separation, stickiness, crystallization; facilitate or maintaining dispersion, dissolution of components, and combinations.

Sorbitan monostearate in the emulsifier may include but is not limited to: sorbitan monostearate, ethers of sorbitan monostearate (polysorbate 60, 65, 80), fatty esters of polyhydric alcohols such as sorbitan monostearate. Other sorbitan fatty acid esters may be used in addition to or in place of sorbitan monostearate, and may include one or more members selected from the group consisting of sorbitan monooleate, sorbitan tristearate, sorbitan monopalmitate, sorbitan monolaurate, and combinations. The sorbitan monostearate may be derived from sorbitol and stearic acids.

The sorbitan monostearate in the emulsifier may account for about 5 to about 25 wt %, about 10 to about 20 wt %, about 5 to about 15 wt %, about 10 to about 18%, about 12 to about 20 wt %, about 10 to about 15 wt %, about 15 to about 20 wt %, or any of the aforementioned range combinations, or about 5, 6, 7, 8, 9, 10, 11, 12, 13, 14, 15, 16, 17, 18, 19, 20, 21, 22, 23, 24 or 25 wt % or any range of any of the aforementioned numbers, of the emulsifier. The sorbitan monostearate in the emulsifier may serve as a destabilizing emulsifying agent, as a surfactant, and may be nonionic.

Propylene glycol may optionally be included in the emulsifier.

The propylene glycol in the emulsifier may account for about 0 to about 6 wt %, 0.1 to about 6 wt %, about 0.1 to about 5 wt %, about 1.0 to about 5 wt %, about 0.5 to about 3 wt %, about 0.5 to about 2 wt %, about 0.1 to about 2.0 wt %, about 0.1 to about 1.0 wt %, about 0.1 to about 1.5 wt %, about 1.0 to about 5%, about 3.0 to about 6.0 wt %, about 2.5 to about 5.0 wt %, or any of the aforementioned range combinations, or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 3.0, 3.5, 4.0, 4.5, 5.0, 5.5, or 6.0 wt %, or any range of any of the aforementioned numbers, of the emulsifier. The propylene glycol may facilitate moisture retention.

Glycerin may optionally be included in the emulsifier, and when present, may be synthetically derived from petroleum or may be derived from natural oils and fats such as palm and coconut.

Glycerin in the emulsifier may account for about 0 to about 6 wt %, about 0.1 to about 6 wt %, about 0.5 to about 5 wt %, about 0.5 to about 3 wt %, about 0.5 to about 2 wt %, about 0.1 to about 2.0 wt %, about 0.1 to about 1.0 wt %, about 0.1 to about 1.5 wt %, about 1.0 to about 5%, about 3.0 to about 6.0 wt %, about 2.5 to about 5.0 wt %, or any of the aforementioned range combinations, or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 3.0, 3.5, 4.0, 4.5, 5.0, 5.5, or 6.0 wt %, or any range of any of the aforementioned numbers, of the emulsifier. Glycerin may serve to increase solubility of non-polar oil in the aqueous phase of the emulsifier.

Lecithin may optionally be included in the emulsifier, and when present, may be derived from one or more vegetable lecithins such as from sunflower, canola, or cottonseed, or from animal fat.

The lecithin in the emulsifier may account for about 0 to about 6 wt %, about 0.1 to about 6 wt %, about 0.5 to about 5 wt %, about 0.5 to about 3 wt %, about 0.5 to about 2 wt %, about 0.1 to about 2.0 wt %, about 0.1 to about 1.0 wt %, about 0.1 to about 1.5 wt %, about 1.0 to about 5%, about 3.0 to about 6.0 wt %, about 2.5 to about 5.0 wt %, or any of the aforementioned range combinations, or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 3.0, 3.5, 4.0, 4.5, 5.0, 5.5, or 6.0 wt %, or any range of any of the aforementioned numbers, of the emulsifier. Lecithin is amphiphilic and may serve to facilitate emulsification by a portion of its molecules being hydrophobic and another portion being hydrophilic, thus dissolving in both oil and water.

Vegetable oils may optionally be included in the emulsifier, and when present, may be derived from one or more vegetables, and may include blended vegetable oil formulas containing a variety of vegetable oils including but not limited to sunflower, canola, grapeseed, olive, avocado, cottonseed, coconut, and palm oil; plant pulp such as grape pulp or tomato pulp.

The vegetable oil in the emulsifier may account for about 0 to about 6 wt %, about 0.1 to about 6 wt %, about 0.5 to about 5 wt %, about 0.5 to about 3 wt %, about 0.5 to about 2 wt %, about 0.1 to about 2.0 wt %, about 0.1 to about 1.0 wt %, about 0.1 to about 1.5 wt %, about 1.0 to about 5%, about 3.0 to about 6.0 wt %, about 2.5 to about 5.0 wt %, or any of the aforementioned range combinations, or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 5.5, or 6.0 wt %, or any range of any of the aforementioned numbers, of the emulsifier.

Other components that may optionally be included in the emulsifier may include, for example, shelf-life extenders, pH adjusters, and preservatives.

According to implementations of the present disclosure, the clean emulsifier blends may comprise the various components disclosed herein along with other components that may facilitate emulsification or other aspects of comestible production.

In other implementations, the clean emulsifier blends may consist essentially of specific components, and may exclude unlisted components or be produced using specific steps and exclude unlisted steps, except those components or steps that do not materially affect the basic and novel properties of the disclosed clean emulsifier blends. For instance, the clean emulsifier blends may include various components and equivalents enumerated herein, and may additionally include components that do not materially affect the emulsification properties of the clean emulsifier, such as shelf-life extenders, pH adjusters, preservatives, inert materials, fillers, and so on.

Methods of Production

The clean emulsifier blends may be produced according to a variety of approaches as will be appreciated according to the various production aspects described throughout the present disclosure. The emulsifier blends may generally be produced by combining a water phase with oil or oil emulsions. The water and/or oil phase may be heated, cooled and/or mixed, prior to and/or during mixing. In some implementations, the clean emulsifier blends may be subjected to sheer to form a consistent vortex. In addition, during production the clean emulsifier blends and precursors thereof may be gradually cooled.

In some implementations, the water phase may be heated to elevated temperatures such as about 150 to about 190° F., about 160 to about 180° F., e.g., about 170° F., about 160 to about 170° F., about 165 to about 170° F., and the water phase may gradually receive the various components of the clean emulsifier blend. The clean emulsifier product may be formed at such elevated temperatures. The elevated temperatures may not reach a boiling temperature.

The water phase and/or oil phase may be mixed at speeds to define a well-defined vortex (e.g., 200 to 3000 rpm depending on the type and amount of material in the mixer). For instance, a pitched-blade propeller using an overhead stirrer (e.g., 2 in. pitched blade in lab settings), an industrial high shear mixer, or other mixing and/or blending devices may be used to define the vortex in the mixture. Such a vortex may be maintained throughout the mixing steps in the process of producing the clean emulsifier blends, adjusting the mixing speed if necessary.

In examples, citric acid, propylene glycol, lecithin (e.g., canola), and a polyglycerol ester may be added to the water phase by mixing. For instance the components may be added at a mixing rate of about 200-450 rpm. The mixture may be heated up to the elevated temperatures, e.g., about 170° F. In some implementations, the water phase may then receive distilled monoglycerides.

The added components in the mixture may be mixed to achieve a uniform appearance, and mono and diglycerides may then be added. The mixture may be heated up to the elevated temperatures, e.g., about 170° F. during mixing, and the speed of the mixer may be adjusted to maintain the vortex.

Upon achieving a uniform appearance and elevated temperature, such as about 170° F., the mixture may receive the sorbitan monostearate and be reheated to the elevated temperatures, e.g., about 170° F. during mixing while maintaining the vortex.

The preceding steps may be conducted in any order or combination. Further, the added components may be mixed prior to addition to the water phase. In such examples, the mixing may be in the presence of a vortex, at elevated temperatures, and combinations. In addition, the preceding steps may be conducted in a water bath, and upon the mixture containing the desired additions reaching the elevated temperatures, e.g., 170° F., the water bath may be removed and replaced with a heated jacket, e.g., a lab jacket, or other heated vessel. Stirring may be maintained and the temperature monitored, e.g., with a thermocouple.

The temperature of the mixture may be gradually cooled, such as by adjusting a heating element to a lower temperature, by use of a votator or heat exchanger, e.g., a scraped surface heat exchanger. As the temperature of the mixture decreases, the mixture may quickly become more viscous. The mixing speed may thus be adjusted, as necessary, to maintain the vortex. Mixing may continue during cooling or upon the mixture reaching a temperature of about 120° F., e.g., about 130 to 120° F., and then mixing may be stopped. The product may be packaged and stored.

One or more of, such as each of, the foregoing addition steps into the water phase may involve mixing at speeds in which the vortex is formed and maintained in the mixture during production. The speed of mixing required to maintain the vortex varies depending on the temperature of the mixture and the amount of material being mixed during formation of the clean emulsifier. For instance, mixing at elevated temperatures disclosed herein, such as about 170° F., may require a mixing speed of about 200 to about 750 rpm (+/−10%), while mixing at about 145° F. may require faster mixing speeds such as about 950 rpm or about 25-450% faster. Similarly, mixing at about 135° F. may require even faster mixing speeds such as about 1500 rpm (+/−10%) or about two to nine times as fast as the original mixing speed, e.g., about two, three, four, five, six, seven, eight or nine times faster. Mixing at about 130° F. may require mixing speeds such as about 2000 rpm (+/−10%) or faster, e.g., 2700 rpm, 3100 rpm (+/−10%), or about three to ten times faster compared to the original mixing speed, e.g., three, four, five, six, seven, eight, nine or ten times faster. The increased mixing speeds may facilitate maintaining the emulsion while gradually cooling the product to the target packaging temperature of about 120° F.

Upon subsequent use in comestible production applications, the packaged clean emulsifier blend may remain as an emulsion, thereby enabling the clean emulsifier to be added as an ingredient in the comestible production process without additional handling or processing requirements.

Methods of Use

In an initial state, clean emulsifier blends may be in liquid form as an oil in water emulsion. The clean emulsifier blends may be stored in bulk quantities and may be used in industrial or commercial food production settings; or may be stored in small quantities for use in smaller scale food production operations.

The clean emulsifier blends may be used to prepare comestibles that are free of the allergenic sources of: milk, eggs, fish, crustacean shellfish, peanuts, wheat, soybeans, and sesame. In addition or alternatively, the clean emulsifier blends may be used to prepare comestibles that exclude GMOs. In addition or alternatively, the clean emulsifier blends may be free of enzymes, benzoic acid, sodium propionate, or other components disclosed herein.

The clean emulsifier blends may complex with protein and starch in batters or doughs, and may provide baked or cooked comestible products that create a cake structure, add softness, and/or prevent starch from recrystallizing after cooling, to thereby add shelf-life to the finished product. The emulsifier may be used in batters and doughs in varying amounts depending on the target finished product, and may account for about 0.1 to about 5 wt % of the product, such as about 0.5 to about 3.0 wt % of the product, about 0.5 to about 2.0 wt %, about 0.7 to about 2.5 wt %, about 1.3 to about 2.5 wt %, about 1.3 to about 3.0 wt %, or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 5.5, or 6.0 wt %, or any range of any of the aforementioned numbers, of the product. Such products may include but are not limited to cakes, cookies, breads, crackers.

The clean emulsifier blends may be combined with carbohydrates, fats, fiber, starch, water, oils, and other comestibles. The carbohydrates, fats, fiber, and/or starch may be commercially available products such as flours, flakes, particles, doughs, or batters derived from the preceding sources. The carbohydrates may be derived from grains, legumes, fruits, vegetables, nuts, and combinations.

In some implementations, the clean emulsifiers are mixed with one or more of: flour, sugar, baking powder, salt, non-fat dry milk or milk substitutes (e.g., nut or vegetable powders), a shortening or fat system (e.g., palm oil or other plant oil, animal fat, butter or combinations), eggs or egg substitute, water and so on.

For instance, a cake formula may contain about 20 to 30 wt % flour, about 30 to 40 wt % sugar, about 0.4 to about 1.0 wt % of each of baking powder and salt, about 2.0 to about 3.0 wt % non-fat dry milk or milk substitute, about 1.0 to about 4.0 wt % shortening or other fat system, about 12 to about 15 wt % eggs, and about 12 to about 25 wt % water.

EXAMPLES

The following examples provide exemplary clean emulsifier blends, and their production and use, according to the present disclosure, and should in no way be construed as limiting.

Example 1

Materials and Methods: The clean emulsifier blend contained the composition of Table 1.

TABLE 1

Clean Emulsifier Blend

| Component | Wt % |
|---|---|
| Water | 58.3% |
| Citric Acid | 0.2% |
| Polyglycerol ester | 11.3% |
| Distilled Monoglycerides | 6.1% |
| Mono and diglycerides (GMS) | 6.1% |
| Sorbitan Monostearate (Lumisorb ™ SMS NGMO) | 14.0% |
| Propylene Glycol | 3.0% |
| Canola Lecithin | 1.0% |
| | 100.0% |

The clean emulsifier blend was prepared according to the following steps. Water was heated in a jacketed vessel to 150° F. and citric acid was added and stirred. The mixture was heated to 165° F. and the lecithin and polyglycerol ester added. The mixture was blended (approx. 30 Hz) and heated to 170° F. The sorbitan monostearate was added until dissolved. The mono and diglycerides (GMS) was added and blended until completely dissolved. The speed of the blender was adjusted to maintain a good shear. Distilled monoglycerides were added and blended until completely dissolved. The speed of the blender was adjusted as needed to maintain a good blend. The final RPM around 2700. Once all ingredients were blended together (around 5-10 minutes) votation started to gradually cool the blend. The oil-in-water product was moved slowly and was recirculated on itself until reaching 120° F. The finished product was then packaged.

Bake Test Results: Cake Formulas A-F are listed in Table 2 (FIG. 1A).

The cake formation in the bake tests of the present disclosure may be carried out according to the following method: Break eggs into container and slightly beat together using immersion blender. Mix dry ingredients (flour, sugar, baking powder, salt, and nonfat dry milk) together. Add the clean emulsifier blend, shortening or fat system, eggs, and water 1 to a mixing bowl. Add dry ingredients. Mix for 1 minute on low speed. Mix on high for 3 minutes. Slowly add water 2 over 1 minute mixing on low. Stop mixer & scrape bowl. Mix on medium for 2 minutes. Pour 55 grams of batter into each of 3 greased muffin tins and 150 grams into greased mini loaf pan. Bake in preheated conventional oven for 25 minutes at conventional baking temperatures, e.g., 300-410° F.

While baking, it was apparent from the cell structure that the clean emulsifier wanted to work, but needed assistance. Due to this, a few variations on the cake batter were tested. A sample of the clean emulsifier was left in a 40° C. oven for 2 days before baking and another sample was left at ambient temperature. Cakes were baked at 24 and approx. 170 hours after the clean emulsifier was produced in the plant.

24 hour bake test. Both cakes used formula B and were baked in Carnegie lab. The cake on the left (FIG. 1B) had reduced bake time (20 vs 25 min.) and the cake on right (FIG. 1C) had reduced bake temp (315° F. instead of 350° F.), due to different ovens.

The cake formula variation bake results are as follows. All cakes were baked in home kitchen using a conventional oven.

Cake Formula A: This formula is a standard cake formula. The results shown in the photographs of the cakes of FIG. 1D indicate noticeable tunneling, but the cell structure around the tunnels was good.

Figure 1E:
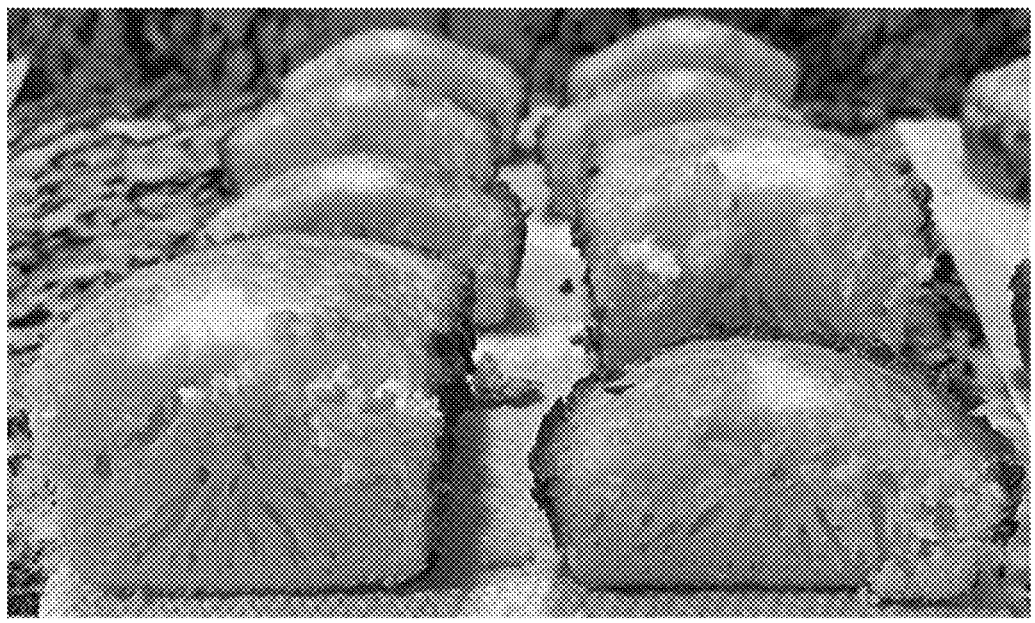

Cake Formula B: Double the amount of ambient clean emulsifier was used compared to in Cake Formula A with a reduction in the amount of shortening to account for the additional clean emulsifier. The results shown in the photograph of the cakes of FIG. 1E were similar to Cake Formula A (FIG. 1D), but better than the 24 hour bake test. This suggests there needs to be a rest period for the emulsifier to form an effective crystalline structure.

Figure 1F:
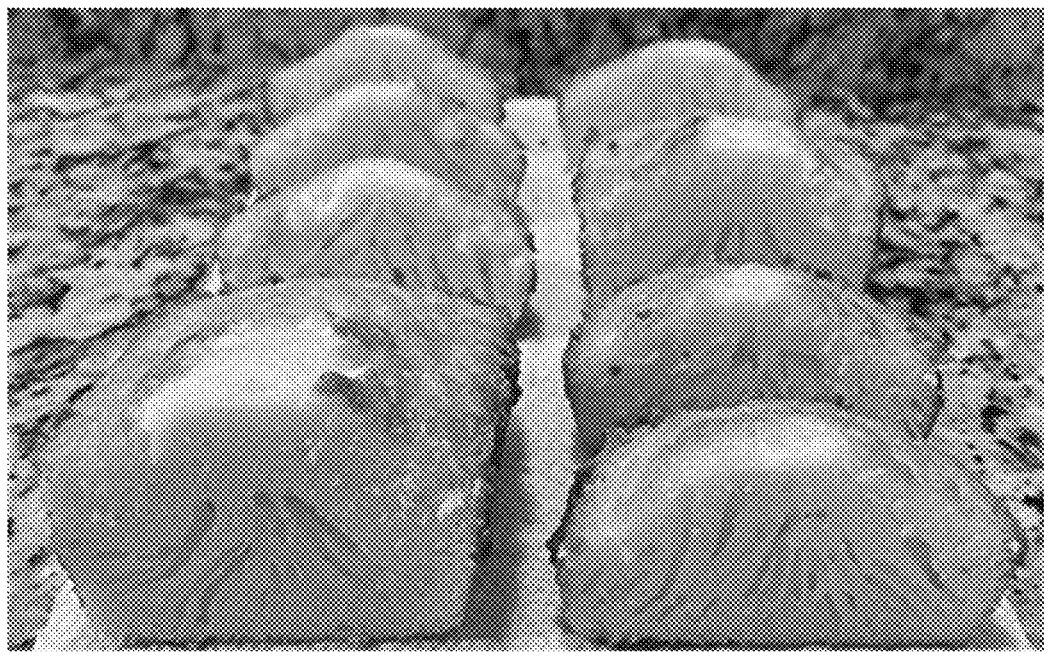

Cake Formula C: Double the amount of the clean emulsifier from 40° C./104° F. oven was used compared to Cake Formula A with a reduction in the amount of shortening to account for the additional clean emulsifier. As shown in the photograph of the cakes of FIG. 1F, the results were similar to Cake Formula B, but slightly worse due to less volume. Ambient storage temperature needed.

Figure 1G:
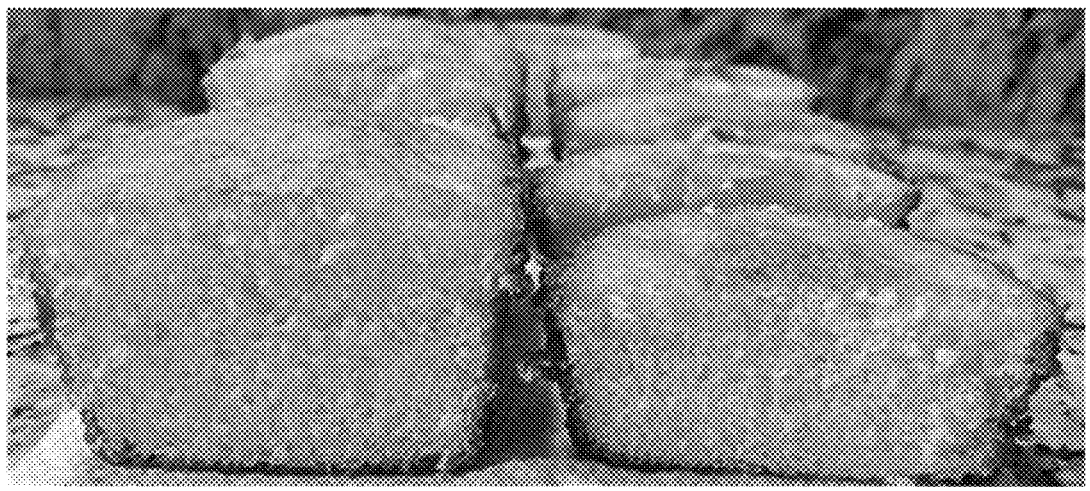

Cake Formula D: Double the amount of ambient clean emulsifier was used compared to Cake Formula A with a reduction in the amount of shortening to account for the additional clean emulsifier, reduced water 2 by approx. ⅔. The results shown in the photograph of the cakes of FIG. 1G were excellent, which suggests that the prior formulas had too much water content.

Figure 1H:
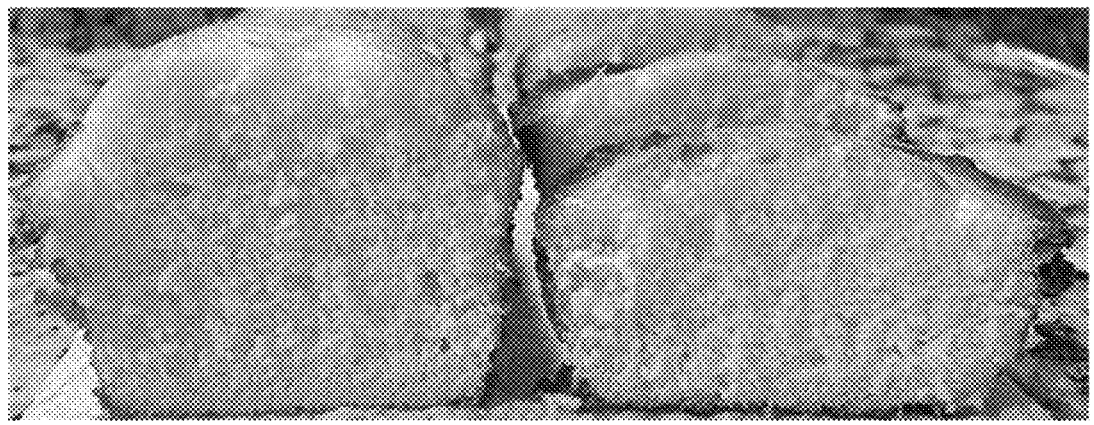

Cake Formula E: Triple the amount of ambient clean emulsifier was used compared to Cake Formula A with a reduction in the amount of shortening to account for the additional clean emulsifier, with good results as shown in photograph of the cakes of FIG. 1H.

Figure 1I:
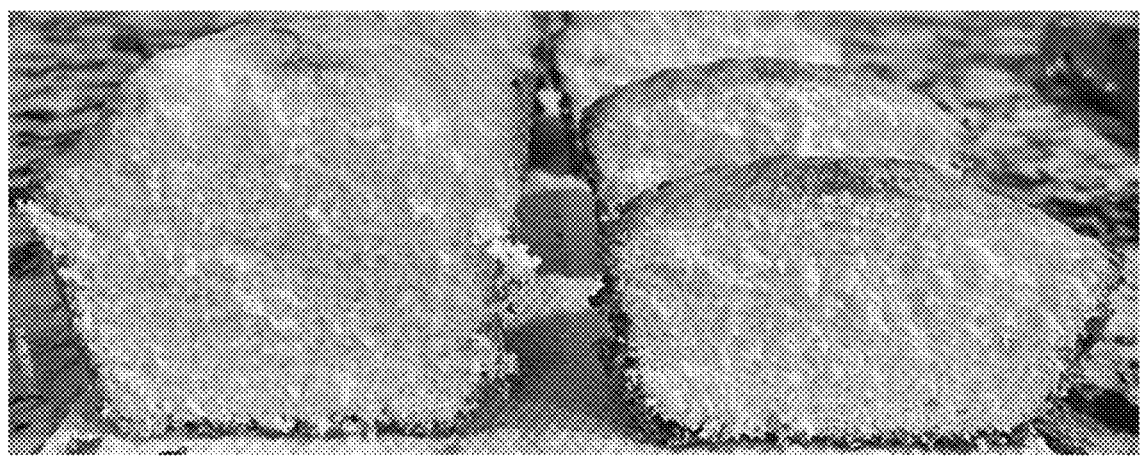

Cake Formula F: Triple the amount of the ambient clean emulsifier was used compared to Cake Formula A with a reduction in the amount of shortening to account for the additional clean emulsifier. Some additional shortening (FG344) was added back, and the amount of water 2 was reduced. The photograph of the cakes of FIG. 1I shows the best results, indicating that water and fat content is important for efficacy of the clean emulsifier in a cake system.

Modifications: The following Modifications led to the clean emulsifier blend of Example 1 and provides useful information for how the clean emulsifier blend of Example 1 may be further refined, for example.

Modification A

Materials and Methods: The clean emulsifier blend of Modification A contained the composition of Table 3.

TABLE 3

Clean Emulsifier Blend (Modification A)

| Description | Wt % |
|---|---|
| Water | 58.4% |
| Citric Acid | 0.20% |
| Polyglycerol ester | 10.9% |
| Glycerin | 2.20% |
| Distilled Monoglycerides | 7.90% |
| Mono and diglycerides (GMS) | 7.90% |
| Sorbitan Monostearate (Lumisorb ™ SMS) | 12.60% |

The clean emulsifier blend of Modification A was prepared according to the following steps. Water was heated in a beaker (A) to 170° F. The polyglycerol ester, distilled monoglycerides, mono and diglycerides and sorbitan monostearate were added to a separate beaker (B) and heat to 165° F. Once the contents of beaker (B) reached at 165° F., the heat was turned-off and glycerin was added. After all contents were blended in oil emulsion slurry beaker (B), citric acid was added to the water beaker (A) and mixed until dissolved for 2 minutes ("citric acid step"). Once all contents were dissolved in the water phase beaker (A), the water phase slurry was added to the oil emulsion slurry and mixed until homogenous. The mixture was cooled until it reached 160° F., then transferred to a pre-chilled ice-cream maker. Cooling of the ice-cream maker was turned-off when the product reached 120° F. Mixing occurred until the product reached 80° F. and was then packaged. The emulsion broke in which creaming, sedimentation and flocculation occurred. A bake test was not conducted.

Modification B

Materials and Methods: The clean emulsifier blend of Modification B contained the composition of Table 4.

TABLE 4

| Clean Emulsifier Blend (Modification B) | |
|---|---|
| Description | Wt % |
| Water | 58.4% |
| Citric Acid | 0.20% |
| Polyglycerol ester | 9.80% |
| Glycerin | 2.20% |
| Distilled Monoglycerides | 9.80% |
| Mono and diglycerides | 9.80% |
| Sorbitan Monostearate | 9.80% |

The clean emulsifier blend of Modification B was prepared according to the method of Modification A up to the citric acid step. The water phase slurry was then added to the oil emulsion phase slurry and subjected to shear at 21,500 RPM for 5 minutes. The product separated as soon as shear was removed, but was easy to mix back into solution using a spatula. The sample, once mixed into solution with the spatula, was separated into two parts. The first half tested to see if the sample would come together in the ice cream maker. The second half was tested to determine if more shear was beneficial.

The first half of Modification B was votated in an ice cream maker, with a temperature of 126° F. when added to ice cream maker. Once the product reached 100° F., the chill was turned-off and mixing was conducted for 20 minutes. The final product had chunks and was bake tested using the method described in the present disclosure, but had poor results.

The second half of Modification B was reheated to 160° F. with the emulsion breaking at 150° F. The temperature was reduced to 130° F. and high shear was used. This was not bake tested due to the appearance of the blend.

Modification B-2

Materials and Methods: The clean emulsifier blend of Modification B-2 contained the composition of Table 5.

TABLE 5

| Clean Emulsification Blend (Modification B-2) | |
|---|---|
| Description | Wt % |
| Water | 58.4% |
| Citric Acid | 0.20% |
| Polyglycerol ester | 9.80% |
| Glycerin | 2.20% |
| Distilled Monoglycerides | 9.80% |
| Mono and diglycerides | 9.80% |
| Sorbitan Monostearate | 9.80% |

The clean emulsifier blend of Modification B-2 was prepared according to the following steps. Water was added to beaker (A) and heated to 170° F. Once heated, citric acid was added and mixed until dissolved. In a separate beaker (B), polyglycerol ester, distilled monoglycerides, mono and diglycerides and sorbitan monostearate were added to a separate beaker and heated to 165° F. Once the emulsion slurry of beaker (B) reached at 165° F., the heat was turned-off and glycerin was added. Once all contents were dissolved in the water phase beaker (A), the emulsion slurry and the water phase beaker (A) were combined, and subjected to shear at about 9,500 RPM for 5 minutes. The mixture was placed in an ice cream maker and mixed until reaching 60° F., at which point the chiller was turned-off and mixing occurred for an additional 2 hours.

While mixing batter during bake test, the batter was acting close to the way batter with a standard emulsification blend behaves, e.g., control emulsifiers, but not quite. Chunks in the Modification B-2 were believed to be due to the product not becoming thoroughly hydrated due to lack of available water and thus limited the ability of the emulsifier to blend into the cake batter. To test this, 100 grams of Modification B-2 was placed in a Ziploc bag and 15 grams of additional water was added. To mimic a chilled votator, the bag was then placed in the freezer and squeezed every 10 minutes over an hour to incorporate the water and chill the new paste. This new product was bake tested at a standard usage rate and at a 2× usage rate.

Figure 2A:
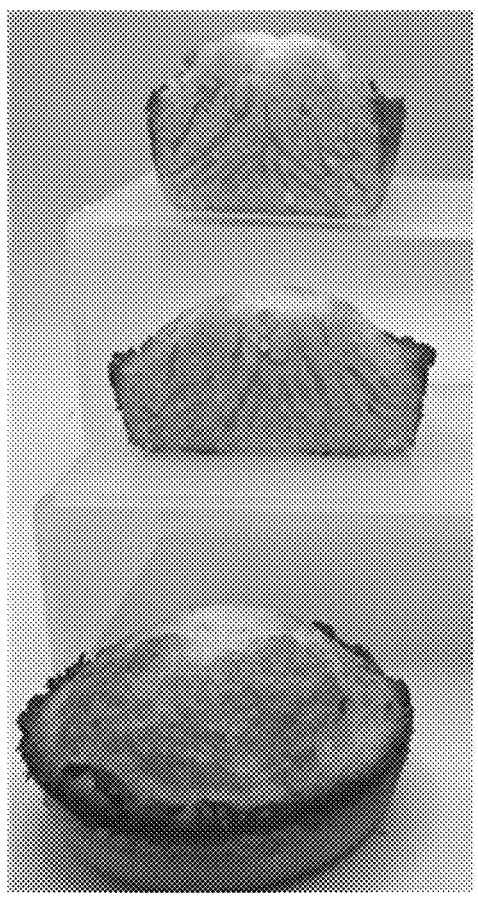
FIGS. 2A-2D are photographs of cakes produced using clean emulsifiers of the present disclosure.
Figure 2B:
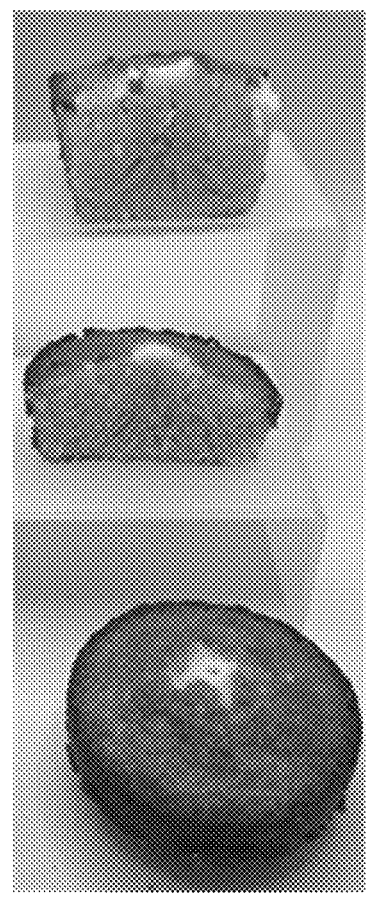

Bake results at standard usage of Modification B-2 showed an improved cake volume but still had significant tunneling as shown in the photograph of the cakes FIG. 2A. The cake with 2×, i.e., double, usage showed a cake with tunneling, but a crumb and volume very close to that of the cake containing a standard emulsification blend and had a better domed shape than the standard emulsification blend containing cakes as shown in the photograph of the cakes in FIG. 2B.

Figure 2C:
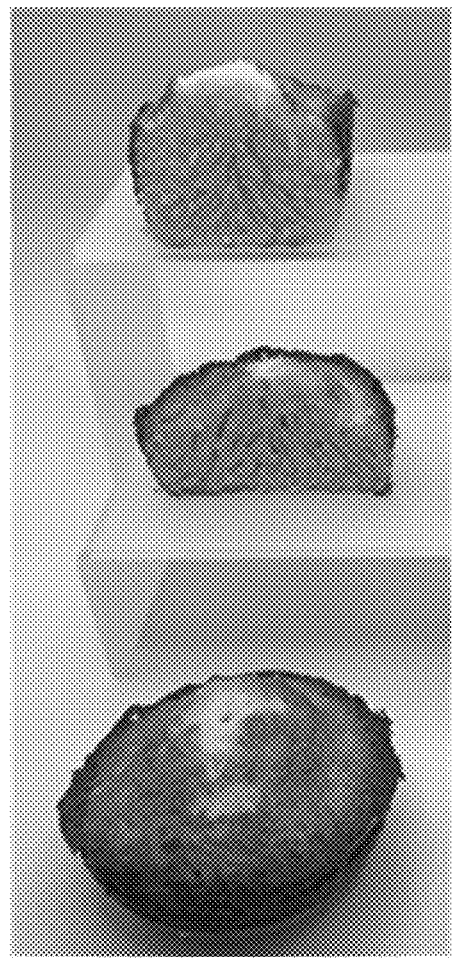
Figure 2D:
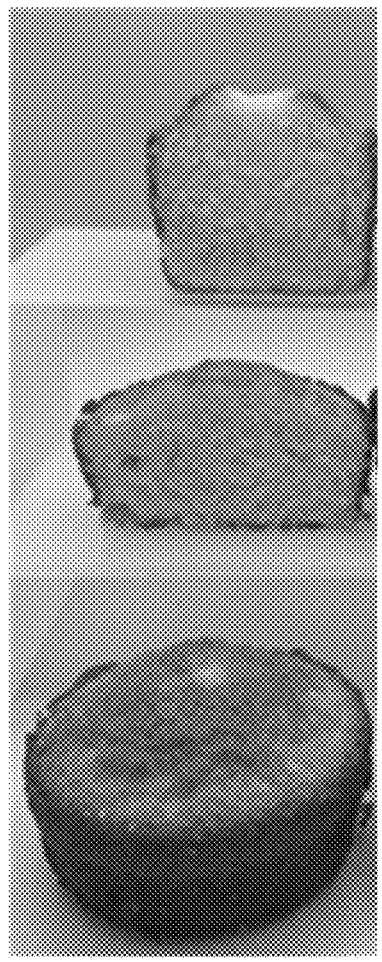

Bake results at standard usage of Modification B-2 with 15% additional water showed an improved cake volume but still had significant tunneling as shown in the photograph of the cakes in FIG. 2C. The cake with 2× usage with 15% additional water showed a cake with very little tunneling, and a crumb and volume very close to that of the cake containing a standard emulsification blend and had a better domed shape than the standard emulsification blend containing cakes as shown in the photograph of the cakes of FIG. 2D. This result shows that while hydration is important, the usage parameters of the clean emulsifier blend may need to be adjusted.

Modifications B-2-3, 4, 5, and 6

Materials and Methods:
The formulas of Table 6 for Modification B-2-3, 4, 5, and 6 were created based on the results from Modification B-2 with the additional water added, and to test various mixing procedures:

TABLE 6

Clean Emulsification Blend (Modification B-2-3, 4, 5, 6)

| Description | B-2-3 wt % | B-2-4 wt % | B-2-5 wt % | B-2-6 wt % |
|---|---|---|---|---|
| Water | 58.3% | 63.8% | 58.3% | 63.8% |
| Distilled monoglycerides | 9.8% | 8.5% | 9.8% | 8.5% |
| Mono and diglycerides | 9.8% | 8.5% | 9.8% | 8.5% |
| Sorbitan Monostearate | 9.8% | 8.5% | 9.8% | 8.5% |
| Citric Acid | 0.2% | 0.19% | 0.2% | 0.2% |
| Polyglycerol ester | 9.8% | 8.5% | 9.8% | 8.5% |
| Glycerin | 2.2% | 1.9% | 2.2% | 1.9% |
| | 100.00% | 100.01% | 100.00% | 100.01% |
| | Add Polyglycerol ester to warm water | | Add Polyglycerol ester to Emulsifiers | |

The emulsifier blend of Modification B-2-3, 4, 5, and 6 were prepared according to the following steps. Water was added to beaker (A) and heated to 170° F. Once heated, citric acid was added and mixed until dissolved. For Modifications B-2-3 & 4, added polyglycerol ester to beaker (A) and shear for 5 minutes at 9,500 RPM.

In a separate beaker (B), distilled monoglycerides, mono and diglycerides, sorbitan monostearate, and polyglycerol ester (for Modifications B-2-5 & 6), were added to a separate beaker and heated to 165° F. Once the emulsion slurry of beaker (B) reached at 165° F., the heat was turned-off and glycerin was added. The water slurry and oil emulsion slurry were added together. For Modifications B-2-3 & 4, mixing was conducted using an overhead stirrer to get a good blend at approximately 1,000 RPM. For Modifications B-2-5 & 6, mixing was conducted using an overhead mixer and shear for 5 minutes at about 9,500 RPM. The products were placed in a room temperature ice cream maker and mixed without the chiller on, until the mixture reached room temperature. None of the above were bake tested as the polyglycerol ester fell out of solution for B-2-5 and B-2-6. B-2-3 created a lumpy product, and water separated out from B-2-4.

Modifications C, C-2, and C-3

Materials and Methods: The formulas of Table 7 for Modifications C, C-2, and C-3 were created based on the results from Modification B-2 and B-2-3, 4, 5, and 6:

TABLE 7

Clean Emulsifier Blend (Modifications C, C-2, and C-3)

| Description | Mod C Percentage | Mod C-2 Percentage | Mod C-3 Percentage |
|---|---|---|---|
| Water | 58.4% | 58.4% | 58.4% |
| Citric Acid | 0.20% | 0.20% | 0.20% |
| Polyglycerol ester | 13.4% | 13.4% | 13.4% |
| Distilled Monoglycerides | 6.50% | 6.50% | 6.50% |
| Mono and diglycerides | 6.50% | 6.50% | 6.50% |
| Sorbitan Monostearate | 15.0% | 15.0% | 15.0% |

Modifications C, C-2, and C-3 was prepared according to the following steps. Water was added to beaker (A) and heated to 170° F. Once heated, citric acid was added and mixed until dissolved. For Modifications C & C-3, added the polyglycerol ester to water and heated back to 170° F.

In a separate beaker (B), distilled monoglycerides, mono and diglycerides, sorbitan monostearate, and polyglycerol ester (for Modification C-2) were added to a separate beaker and heated to 165° F. while stirring with an overhead mixer and mixing speed was adjusted as needed while melting. Once the emulsion slurry of beaker (B) reached at 165° F., the heat was turned-off and glycerin was added. Once all contents were dissolved in the water phase beaker (A), slowly added the water slurry to the oil slurry (B) (for Modifications C and C-3), or added the oil slurry (B) to the water slurry (for Mod C-2) while mixing with an overhead mixer. The blend was reheated to 170° F.

For modifications C and C-2, the mixture as added to a pre-chilled ice cream maker. Once the temperature was cooled to 100° F., the chiller was turned-off and mixed for 1.5 hours.

For modification C-3, the mixture was held at 170° F. and stirred for 1 hour at approximately 1,000 RPM. It is important not to have too high of RPM or polyglycerol ester bubbles will form. The mixture was not votated but was removed from heat, and packaged and cooled to 100° F. For all modifications, the bake test conducted according to the method of the present disclosure resulted in cake with a lot of tunneling.

Modification D

Materials and Methods: The formulas of Table 8 for Modification D is as follows.

TABLE 8

Clean Emulsifier Blend (Modification D)

| | Batch Size wt % |
|---|---|
| Water | 58.4% |
| Citric Acid | 0.20% |
| Polyglycerol ester | 0.00% |
| Distilled Monoglycerides | 8.2% |
| Mono and diglycerides (Aldo HMS) | 8.2% |
| Sorbitan Monostearate (Lumisorb ™ SMS) | 19.00% |
| Propylene Glycol | 0.00% |
| Glycerin | 6.00% |

Modification D was prepared by mixing glycerin with other melted emulsifiers. Water was heated and added to the emulsifier blend. This formed a hard foam immediately upon mixing the emulsifiers into the water. Modification D was not bake tested due to hardness of the product as it would not break down and mix well.

Modification E

Materials and Methods: The formulas of Table 9 for Modification E is as follows. Modification E was based off the control emulsifier blend of Table 9. Citric acid replaced benzoic acid and sodium propionate. Propylene glycol was replaced with glycerin. Emplex flakes (sodium stearoyl-2-lactylate) replaced with canola lecithin, and polyglycerol esters replaced Polysorbate 60.

TABLE 9

Clean Emulsifier (Modification E)

| | Mod E wt % | Control wt % |
|---|---|---|
| Water | 58.4 | 58.4 |
| Distilled mono | 6.1 | 6.1% |
| Mono and diglycerides (GMS) | 6.1 | 6.1 |
| Sorbitan Monostearate NGM | 14.0 | 14.0 |
| Citric acid | 0.2 | |
| Glycerin | 3.0 | |
| Polyglycerol ester | 12.1 | |
| Canola lecithin | 0.2 | |
| Benzoic Acid | | 0.11 |
| Sodium Propionate | | 0.11 |
| Polysorbate 60 | | 12.1 |
| Propylene Glycol | | 3.0 |
| Emplex Flakes | | 0.2 |

Modification E was prepared by heating water to 160° F. The polyglycerol ester, citric acid, and canola lecithin were added while mixing. The mixture was heated back to 170° F. The distilled monoglycerides, mono and diglycerides, sorbitan monostearate and glycerin were melted together while mixing with an overhead mixer. The mixing speed was adjusted as needed during melting process and was heated to 170° F. Water was added into the emulsion blend. The mixture foamed significantly when the water was added to emulsifier blend. Testing did not continue as the amount of foam created would be a significant issue in production. However, this might be worthwhile testing with propylene glycol instead of glycerin, to keep the formula closer to the standard emulsifier blend (control).

Water Content and Distilled Monoglycerides Working Example

Due to the belief that too much water may be present in clean emulsifier formulations, a study of the effect of changing water content and removing distilled monoglycerides from the clean emulsifier was studied. Different formulations of the clean emulsifier were mixed, which contained varying concentrations of water (43%, 50%, and 58%) and either contained or omitted distilled monoglycerides as an ingredient.

Materials and Methods:

The ingredients for each formulation are referenced in Table 10 (FIG. 3A). The compositions of the clean emulsifiers contained a high amount (58%—SK Hi Water), low amount (43%—SK Low Water), and medium amount (50%—SK Mid Water) of water, with and without distilled monoglycerides (No DM).

Figure 3B:
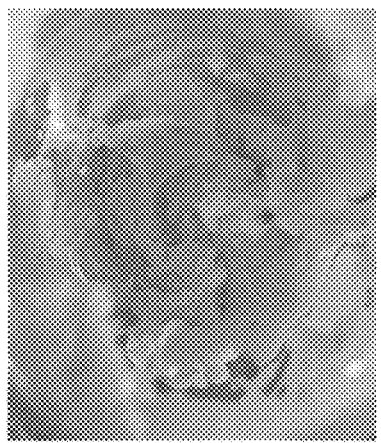
FIGS. 3B-3G are photographs of the final appearance of each clean emulsifier of the compositions listed in Table 10.
Figure 3C:
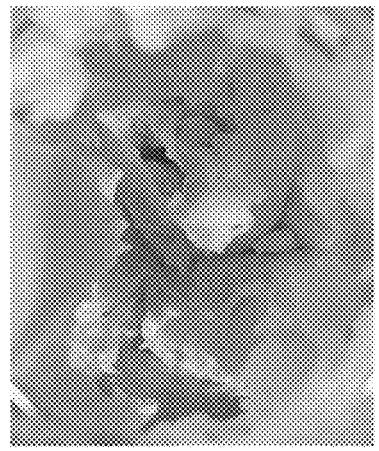
Figure 3D:
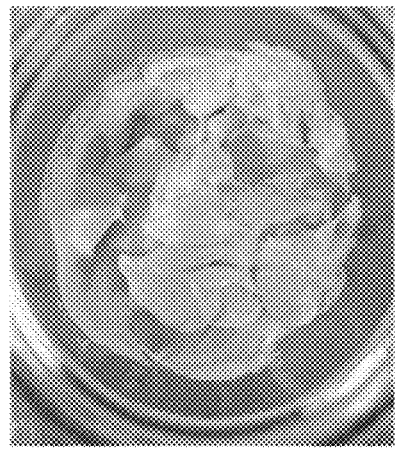
Figure 3E:
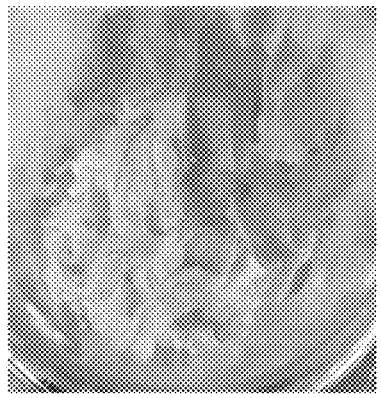
Figure 3F:
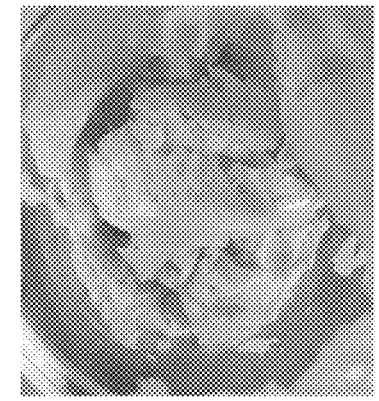
Figure 3G:
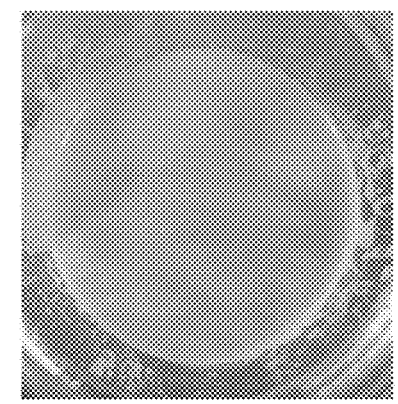

A water bath provided a heat reservoir to mitigate the temperature drop upon addition of ingredients and to heat the vessel more uniformly. Water was added to a vessel, 2 L beaker, covered with aluminum foil to mitigate evaporation, and stirred at 200 rpm. The temperature was raised to 170° F. Never throughout the mixing process did the surrounding water bath reach a vigorous boil. Citric acid was added, propylene glycol, canola lecithin, and polyglycerol ester were added and the mixing speed was increased to 400 rpm. The temperature dropped as these ingredients were added and, once the temperature returned to 170° F., distilled monoglycerides (if applicable) were added and the mixing speed increased until there was a well-defined vortex (but no splashing) in beaker. The vortex maintained throughout the mixing process, adjusting the mixing speed if necessary. Mixing speeds as high as 2800 rpm were required in some cases. Once the mixture was uniform in appearance, mono and diglycerides (GMS) was added. Then, once uniform, sorbitan monostearate (SMS KP) was added. The hot plate set temperature was set to 350° C. and, once 170° F. was reached, the water bath was removed and the replaced with a lab jack. Stirring was maintained and the temperature monitored with a thermocouple. As the temperature decreased, the mixture will quickly become more viscous. The mixing speed was adjusted, as necessary, to maintain a vortex. At 120° F., mixing was ceased, and the product yield was determined before packaging into jars preheated to 50° C. The final appearance of each mixture is shown in the photographs of the clean emulsifiers of FIGS. 3B-3G in which the photograph of FIG. 3B shows the clean emulsifier with a low water content; the photograph of FIG. 3C shows the clean emulsifier with a medium water content; the photograph of FIG. 3D shows the clean emulsifier with a high water content; the photograph of FIG. 3E shows the clean emulsifier with a low water content and no distilled monoglycerides; the photograph of FIG. 3F shows the clean emulsifier with a medium water content and no distilled monoglycerides; the photograph of FIG. 3G shows the clean emulsifier with a high water content and no distilled monoglycerides.

The emulsifiers with the low, medium and high water content, with and without distilled monoglycerides were subjected to the bake test of the present disclosure, and the resulting cakes showed acceptable results even in the absence of distilled monoglycerides. While not being desired to be bound by a particular theory, it is believed that the amount of water in the clean emulsifier blend may have a correlation to the content of monoglycerides and diglycerides, which may enable the exclusion of distilled monoglycerides in certain clean emulsifiers of the present disclosure.

Sensory Evaluation

FIG. 4 illustrates sensory evaluation of cupcakes using the clean emulsifier formula 410 of Table 1 as compared to a control emulsifier 420 that is not GMO-free and to a negative control 430 (e.g., a cupcake without an emulsifier). The not GMO-free emulsifier contained the control formula of Table 9. The cupcakes containing the clean emulsifier contained the cake formula E on Table 2. In these cupcakes, triple the amount of emulsifier was used compared to the emulsifier that was not GMO-free, for reasons disclosed above. The cupcakes with the emulsifier that was not-GMO free contained the cake formula A of Table 2 except the emulsifier was not-GMO free. The cupcakes containing the negative control required reformulation due to the absence of the emulsifier.

Table 11 shows the sensory evaluation results:

TABLE 11

|  | Control Emulsifier | | Negative Control | | Clean Emulsifier | |
| --- | --- | --- | --- | --- | --- | --- |
|  | Avg. | Std. Dev. S | Avg. | Std. Dev. S | Avg. | Std. Dev. S |
| Appearance | 7.733333 | 0.798809 | 5.8 | 1.521277659 | 6.533333333 | 2.099886618 |
| Texture (hand feel) | 6.466667 | 1.9223 | 3.076923 | 1.320450584 | 5.933333333 | 2.086236073 |
| Mouthfeel | 6.076923 | 2.019139 | 2.916667 | 1.443375673 | 5.428571429 | 2.31098666 |
| Aroma | 7.071429 | 1.328057 | 6.357143 | 1.598419549 | 7.428571429 | 1.452546078 |
| Flavor | 7.214286 | 1.121714 | 5.538462 | 2.258885589 | 7.071428571 | 1.384768001 |
| Overall | 6.866667 | 1.187234 | 3.333333 | 1.67616342 | 5.933333333 | 2.016597795 |

Although cupcakes with the control emulsifier scored better overall than cupcakes made with the clean emulsifier of the present disclosure (6.87 vs 5.93), the clean emulsifier showed a significant improvement over cupcakes made without any emulsifier and performed similarly to the control emulsifier (5.93 vs 3.33) such that consumers desiring to have clean emulsifiers free of allergens and GMOs would find this emulsifier acceptable for their desired needs.

As used herein, the term "about" modifying, for instance, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A method of producing an emulsifier blend for comestibles, comprising the steps of:
   in a vessel, admixing water with citric acid, propylene glycol, lecithin, and polyglycerol ester to form an admixture while mixing at a first mixing rate during heating to an elevated temperature of at least about 150° F., wherein a vortex is formed in the admixture at the first mixing rate;
   maintaining the vortex in the admixture while adding mono and diglycerides to the vessel and reheating to the elevated temperature;
   maintaining the vortex in the admixture while adding sorbitan monostearate to the vessel and reheating to the elevated temperature,
   wherein an emulsifier blend at the elevated temperature is formed in the vessel with the vortex maintained;
   gradually decreasing a temperature of the emulsifier blend in the vessel while subjecting the emulsifier blend to a second mixing rate higher than the first mixing rate to maintain the vortex,
   wherein the emulsifier blend contains at least 40 wt % water, and wherein water accounts for more of the emulsifier blend than any other component of the emulsifier blend.

2. The method of claim 1, further comprising subjecting the emulsifier blend to a third mixing rate higher than the second mixing rate during the step of gradually decreasing the temperature.

3. The method of claim 1, wherein the elevated temperatures is about 170° F.

4. The method of claim 1, further comprising maintaining the emulsifier blend at the elevated temperature prior to the step of gradually decreasing the temperature of the emulsifier blend.

5. The method of claim 1, wherein upon the emulsifier blend reaching a temperature of about 130° F., ceasing mixing, and packaging the emulsifier blend.

6. The method of claim 1, further comprising maintaining the vortex in the admixture while adding distilled monoglycerides to the vessel and heating to the elevated temperature.

* * * * *